(12) United States Patent
Porter

(10) Patent No.: US 10,454,191 B2
(45) Date of Patent: Oct. 22, 2019

(54) CONNECTORS FOR ELECTRICAL JUMPER CABLES

(71) Applicant: Sensible Solutions Inc., Preston, ID (US)

(72) Inventor: Terrel Porter, Preston, ID (US)

(*) Notice: Subject to any disclaimer, the term of this patent is extended or adjusted under 35 U.S.C. 154(b) by 0 days.

(21) Appl. No.: 15/908,800

(22) Filed: Feb. 28, 2018

(65) Prior Publication Data
US 2018/0248281 A1 Aug. 30, 2018

Related U.S. Application Data

(60) Provisional application No. 62/464,759, filed on Feb. 28, 2017.

(51) Int. Cl.
| | | |
|---|---|---|
| *H01R 11/24* | (2006.01) | |
| *H01B 9/00* | (2006.01) | |
| *H02J 1/00* | (2006.01) | |
| *H01R 11/28* | (2006.01) | |

(52) U.S. Cl.
CPC .......... *H01R 11/24* (2013.01); *H01B 9/006* (2013.01); *H01R 11/288* (2013.01); *H02J 2001/006* (2013.01)

(58) Field of Classification Search
CPC ...... H01R 11/24; H01R 11/281; H01R 11/288
USPC .......................................................... 439/504
See application file for complete search history.

(56) References Cited

U.S. PATENT DOCUMENTS

| | | | | |
|---|---|---|---|---|
| 2,714,198 A * | 7/1955 | Schloetzer | ............. | H01R 11/24 439/822 |
| 3,259,754 A * | 7/1966 | Matheson | ............. | G01R 19/14 24/133 |
| 3,840,843 A * | 10/1974 | Izraeli | ...................... | H01R 4/64 439/180 |
| 3,988,051 A * | 10/1976 | Robinson | ................ | H01R 4/64 439/772 |
| 4,272,142 A * | 6/1981 | Zapf | .................... | H01R 13/717 439/504 |
| 4,488,147 A * | 12/1984 | Signorile | ............ | G01R 31/041 320/105 |
| 4,969,834 A * | 11/1990 | Johnson | ............. | H01R 13/6691 320/105 |
| 5,984,718 A * | 11/1999 | James | .................... | H01R 13/64 439/504 |
| 6,527,585 B1 * | 3/2003 | Pannone | ................ | H01R 11/24 439/504 |
| 6,638,101 B1 * | 10/2003 | Botelho | ................ | H01R 11/24 439/188 |
| 6,871,387 B2 * | 3/2005 | Cheng | .................... | H01R 11/24 24/499 |
| 6,899,552 B1 * | 5/2005 | Robinson | .............. | H01R 11/24 439/133 |
| 8,083,555 B2 * | 12/2011 | Schouten | .............. | H01R 11/24 439/822 |
| 8,302,512 B2 * | 11/2012 | Shih | ........................ | B25B 7/123 269/6 |

(Continued)

*Primary Examiner* — Tulsidas C Patel
*Assistant Examiner* — Peter G Leigh
(74) *Attorney, Agent, or Firm* — Durham Jones & Pinegar, P.C., Intellectual Property Law Group

(57) ABSTRACT

Electrical cables, such as battery jumper cables, include connectors with thin, elongated jaws that are capable of being introduced into small spaces and of securely clamping onto the terminals of a battery of a car or another vehicle. The connectors may comprise locking pliers.

15 Claims, 3 Drawing Sheets

(56) References Cited

U.S. PATENT DOCUMENTS

| | | | | |
|---|---|---|---|---|
| 8,376,775 B2* | 2/2013 | Rinehardt | .............. | H01R 11/24 |
| | | | | 439/490 |
| 8,604,343 B2* | 12/2013 | Nixon-Lane | .............. | E06B 7/28 |
| | | | | 174/114 R |
| 9,484,760 B2* | 11/2016 | Pierson | ................. | H02J 7/0054 |
| 2003/0100216 A1* | 5/2003 | Chang | ................. | H01R 11/288 |
| | | | | 439/489 |
| 2015/0072572 A1* | 3/2015 | Easterling | .............. | H01R 11/24 |
| | | | | 439/863 |

* cited by examiner

CONNECTORS FOR ELECTRICAL JUMPER CABLES

CROSS-REFERENCE TO RELATED APPLICATION

A claim for the benefit of priority to the Feb. 28, 2017 filing date of U.S. Provisional Patent Application No. 62/464,759, titled CONNECTORS FOR ELECTRICAL CABLES ("the '759 Provisional Application") is hereby made pursuant to 35 U.S.C. § 119(e). The entire disclosure of the '759 Provisional Application is hereby incorporated herein.

TECHNICAL FIELD

This disclosure relates generally to electrical cables, including, but not limited to, battery jumper cables, which are used to supply electrical power to discharged, or "dead," batteries of cars and other vehicles. More specifically, this disclosure relates to electrical cables with connectors with thin, elongated jaws that are capable of being introduced into small spaces and of securely clamping onto the terminals of a battery of a car or another vehicle. This disclosure also relates to connectors that are configured to be secured to the ends of jumper cables and other electrical cables.

RELATED ART

Conventional jumper cables, which are also referred to as "booster cables," and other types of electrical cables typically include large alligator clips at their ends. Due to the configurations of the alligator clips on most conventional jumper cables, it is often difficult to secure the alligator clips on most conventional jumper cables to the terminals of a vehicular battery. In addition, the alligator clips on most conventional jumper cables are relatively large, which may prevent their introduction into tight spots, making it even more difficult to secure the jumper cables in place and to ensure that proper electrical connections have been established between the jumper cables and the terminals of the battery.

The thicknesses of the electrically conductive elements of jumper cables are typically measured in units of American wire gauge (AWG or gauge), or the "Brown & Sharpe wire gauge," with lower AWG numbers corresponding to larger diameter cables and lower AWG numbers corresponding to smaller diameter cables, or wires. So-called "heavy duty" jumper cables include electrically conductive elements with diameters of about 0.2 inch or less, or gauges of about 4 AWG or more. Diameters of about 0.13 inch (8 AWG) and 0.1 inch (10 AWG) are much more common. These thicknesses (even the "heavy duty" 4 AWG thickness) are undesirably small for many applications, including uses in repair shops, for jumping the batteries of large trucks, agricultural equipment, and industrial equipment, for use with arc welding equipment, or the like.

DISCLOSURE

An electrical cable according to this disclosure includes at least one cable and a connector at an end of the cable(s). The electrical cable may be embodied as jumper cables, which are capable of supplying electrical power from a power source (e.g., a battery charger, a first battery, etc.) to a discharged battery, to establish an electrical ground (e.g., in arc welding, etc.), or for any other suitable purpose.

In embodiments where the electrical cable is a jumper cable, a pair of cables may be used. The pair of cables of the jumper cable may comprise a pair of electrically conductive cables that are coated with an electrically insulative material. The electrically insulative material may secure the cables to one another, and it may be color-coded to facilitate the electrical connection of each cable to appropriate, corresponding terminals of the power source and the discharged battery and to prevent "crossing" the cables in a manner that results in short circuiting, causes sparks, and presents a variety of hazards, including explosion of the power source or the discharged battery. In some embodiments, one cable may be designated as a "positive" cable while the other cable may be designated as a "negative" cable. The electrically insulative coating on the positive cable may be red, while the electrically insulative coating on the negative cable may be black, blue, or green.

In various embodiments, including embodiments where an electric cable is part of jumper cables, the connector may comprise a connector, which may be configured to secure and electrically couple an electrically conductive element of the cable to a terminal (e.g., a battery terminal, another terminal of a power source, etc.), an electrical ground, or the like.

One or more of the connectors of the cable(s) may comprise locking pliers, such as those sold as VISE-GRIP® locking pliers. The locking pliers may include a pair of opposed jaws that may be positioned a desired distance apart from one another, and may be locked into place on a terminal of a battery, a terminal of another power source, or an electrical ground. The relative arrangement of the jaws, as well as their configurations and the use of locking pliers as a connector may enable the jaws to readily and securely engage the terminal or an electrical ground and establish a reliable electrical connection with the terminal or the electrical ground. In addition, the configurations of the jaws (e.g., they may be relatively long and thin, etc.) may enable them to reach and engage terminals that are located in tight spots where the alligator clip-type connectors of conventional jumper cables could not be used.

In some embodiments, the jaws of the connector may be oriented in the same manner as the jaws of conventional locking pliers. Thus, when the jaws are positioned as close as possible to one another and closed by pivoting a moveable handle of the locking pliers toward a fixed handle of the locking pliers, the jaws are oriented in substantially the same direction as one another or in converging or intersecting directions. In other embodiments, the jaws of the connector may be configured in such a way that, when they are positioned as close as possible to one another and closed by pivoting the moveable handle toward the fixed handle, they extend in divergent directions.

Each connector may include an insulative coating on its handles. The insulative coating may provide an indication of the terminal (positive or negative) with which the connector is to be used. As an example, the insulative coating on the handles of a connector that is designated for use on a positive terminal may be red, while the insulative coating on the handles of a connector that is designated for use on a negative terminal or for connection to an electrical ground may be black, blue, or green.

A handle of the connector may be coupled to the end of an electrically conductive element of one of the cables in a manner that establishes electrical communication between the electrically conductive element, the handle, and a jaw associated with the handle. That coupling may be permanent (e.g., by way of a clamped interference fit, by way of a weld, etc.). Alternatively, a removable coupling may be provided between the end of an electrically conductive element of a cable and a handle of a connector according to this disclosure. Such a removable coupling may comprise an electrically conductive bracket that is fixed to or that may be fixed to a handle of the connector. The bracket may include a receptacle that is capable of receiving an end of the electrically conductive element of a cable, as well as an engagement element (e.g., a bolt, etc.) capable of securing the end of the electrically conductive element in the receptacle and of establishing electrical communication between the electrically conductive element and the electrically conductive bracket (and the handle and corresponding jaw of the connector).

In another aspect, connectors that are configured to be secured to the ends of electrically conductive elements of existing cables are disclosed. Such a connector may include a removable coupling element, such as an electrically conductive bracket, that enables the connector to be secured to removably secured to the end of an electrically conductive element of an existing cable. Such a connector may enable an individual to retrofit existing jumper cables or to select a particular length and gauge of cable.

Various methods are also within the scope of this disclosure, including methods for assembling jumper cables, methods for retrofitting jumper cables, and methods for using locking pliers to electrically couple the electrically conductive element of a cable to a terminal, an electrical ground, or any other object to which an electrical connection is to be made.

Other aspects, as well as various features and advantages of various aspects of the disclosed subject matter will become apparent from the ensuing description, the accompanying drawings, and the appended claims.

DETAILED DESCRIPTION

Figure 1:
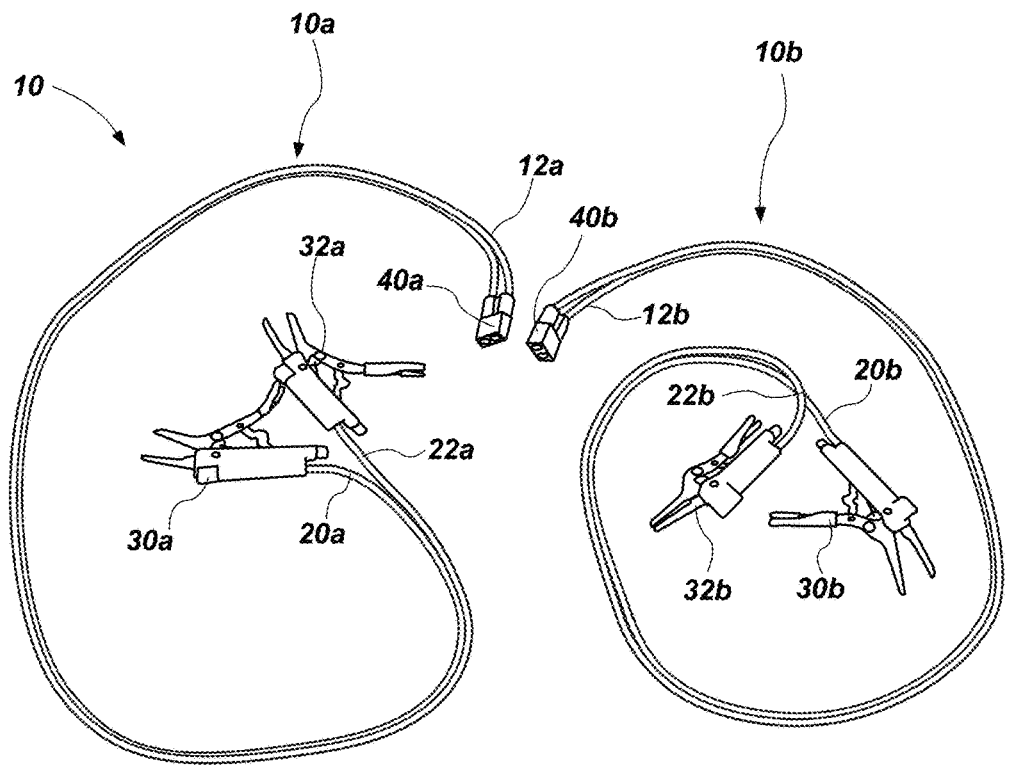
FIG. 1 depicts an embodiment of electrical cables according to this disclosure.

With reference to FIG. 1, an embodiment of an electrical cable 10 according to this disclosure is illustrated. The electrical cable 10 comprises jumper cables with two sides 10*a* and 10*b*. Each side 10*a*, 10*b* of the electrical cable 10 includes a pair adjacent cables 20*a*, 22*a* and 20*b*, 22*b*. A plug 40*a*, 40*b* is coupled to a central end 12*a*, 12*b* of each side 10*a*, 10*b* of the electrical cable 10. The plugs 40*a* and 40*b* are capable of matingly coupling to one another in a manner that connects the corresponding cables 20*a* and 20*b*, 22*a* and 22*b* on the two sides 10*a* and 10*b* of the electrical cable 10 to each other. A connector 30*a*, 32*a*, 30*b*, 32*b* is located at an outer end of each cable 20*a*, 22*a*, 20*b*, 22*b*, respectively, the electrical cable 10.

Figure 2:
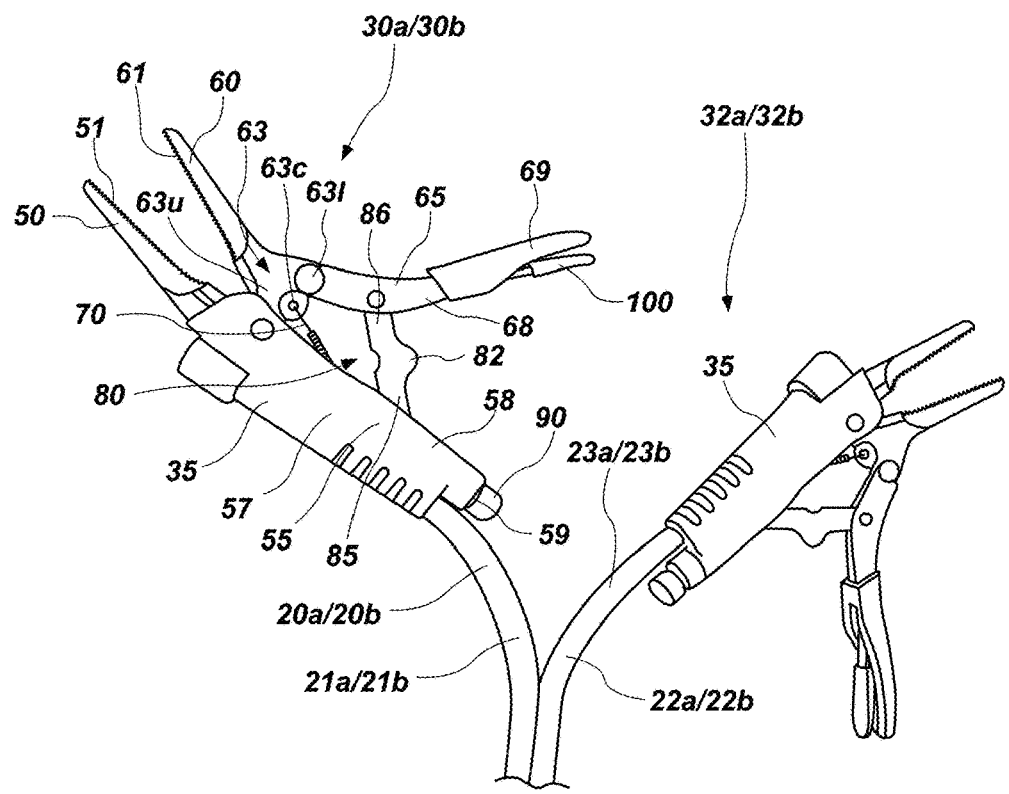
FIG. 2 illustrates a pair of connectors at an end of the electrical cables.

With reference to FIG. 2 the cables 20*a*/20*b*, 22*a*/22*b* and the connectors 30*a*/30*b*, 32*a*/32*b* are depicted in further detail. Each cable 20*a*/20*b*, 22*a*/22*b* includes an electrically conductive element that is coated with an electrical insulator 21*a*/21*b*, 23*a*/23*b*. The electrical insulator 21*a*/21*b*, 23*a*/23*b* may be formed from an electrically insulative material, such as rubber or another suitable polymer. The electrically insulative material may secure the cables to one another, and it may be color-coded to facilitate the electrical connection of each cable to appropriate, corresponding terminals of the power source and the discharged battery and to prevent "crossing" the cables in manner that results in short circuiting, causes sparks, and presents a variety of hazards, including explosion of the power source or the discharged battery. In some embodiments, one cable may be designated as a "positive" cable while the other cable may be designated as a "negative" cable. Without limitation, the electrical insulator 21*a*/21*b* on a cable 20*a*/20*b* that may be designated for use with a positive terminal of a battery may be red, while the electrical insulator 23*a*/23*b* on a cable 22*a*/22*b* that may be designated for use with an electrical ground or a negative terminal may be black, blue, or green.

Each connector 30*a*/30*b*, 32*a*/32*b* may comprise locking pliers, similar to those sold as VISE-GRIP® locking pliers. Each connector 30*a*/30*b*, 32*a*/32*b* may include a pair of jaws 50 and 60 that are opposed to one another and a pair of handles 55 and 65 that correspond to jaws 50 and 60, respectively. Handle 55 may comprise a fixed handle. Handle 65 may comprise a moveable, locking handle.

Figure 3:
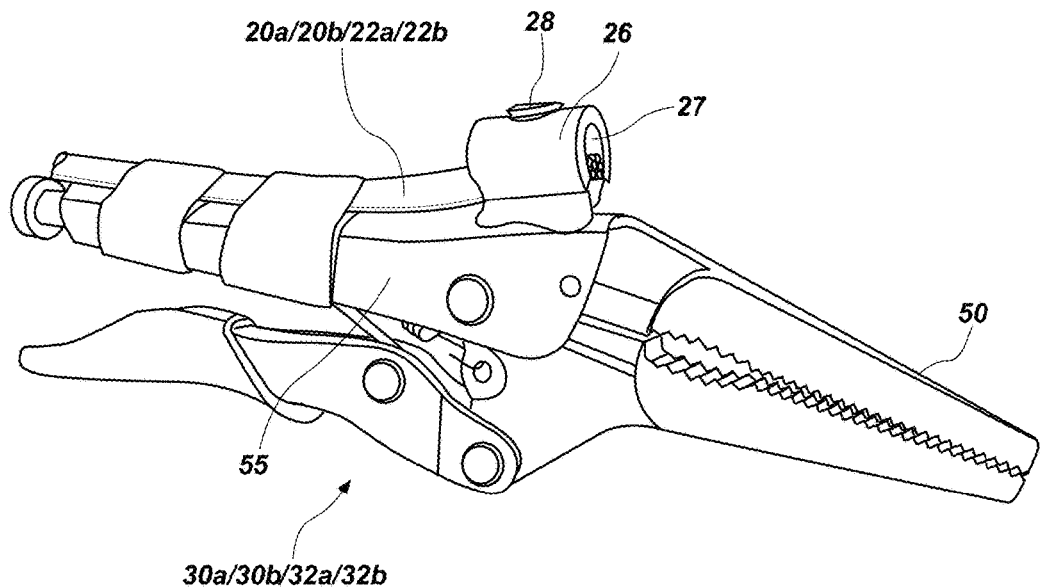
FIGS. 3 and 4 show an embodiment of a manner in which a conductive element of an electrical cable may be electrically coupled to a connector.
Figure 4:
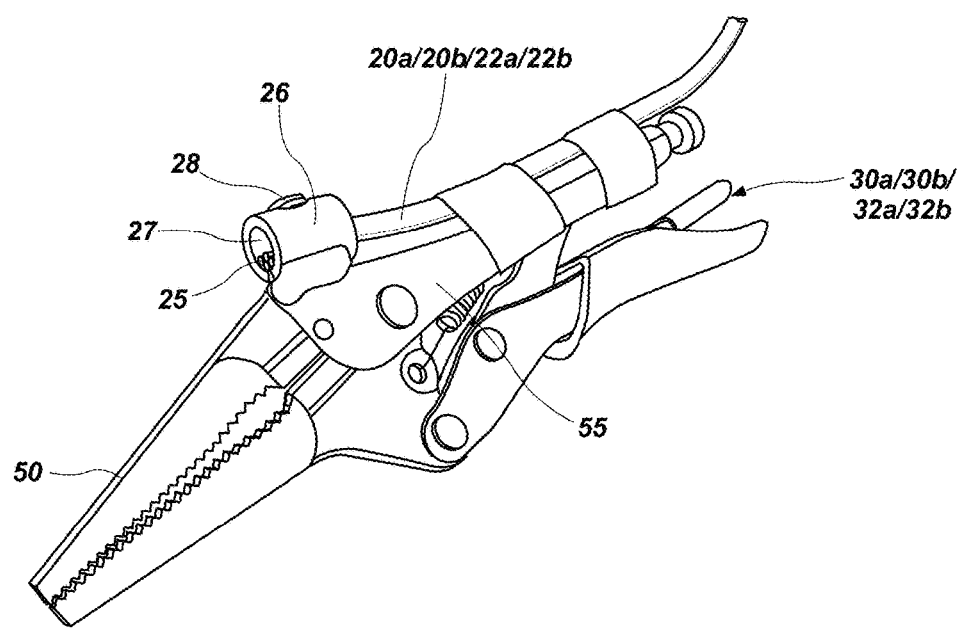

The relative arrangement of the jaws 50 and 60, as well as their configurations and the use of the connector 30*a*/30*b*, 32*a*/32*b* may enable the jaws 50 and 60 to readily and securely engage the terminal or an electrical ground and establish a reliable electrical connection with the terminal or the electrical ground. For example, the opposed surfaces 51 and 61 of the jaws 50 and 60, respectively, may comprise teeth 52, 62 (FIGS. 3 and 4). Teeth 52, 62 on the jaws 50 and 60 may enable the jaws 50 and 60 to securely engage and establish a reliable electrical connection with a terminal of a battery or of another power source, an electrical ground, or the like. The teeth 52, 62 may be capable of piercing, or breaking through, any corrosion and/or oxidation on the terminal, the electrical ground, etc. As another example, the configurations of the jaws 50 and 60 (e.g., they may be relatively long and thin, etc.) may enable them to reach and engage terminals that are located in tight spots where the alligator clip-type connectors of conventional jumper cables could not be used.

In some embodiments, each connector 30*a*/30*b*, 32*a*/32*b* may be configured in the same manner as conventional locking pliers. More specifically, an inner end 53 of jaw 50 and an upper portion 63*u* of an inner end 63 of jaw 60 may be pivotally connected to each other at an outer end 56 of the fixed handle 55. A lower portion 63*l* of the inner end 63 of jaw 60 may be pivotally connected to an outer end 66 of the moveable handle 65. A spring 70 may extend between a central portion 63*c* of the inner end 63 of jaw 60 to a central portion 57 of the fixed handle 55. A link 80 may extend between the opposed surfaces 58 and 68 of the handles 55 and 65 (i.e., the surfaces that face each other), which opposed surfaces 58 and 68 may include recesses, or slots. A first end 85 of the link 80 may be received by and capable of sliding along a length of the recess in the surface 58 of the fixed handle 55. An adjustment screw 90 at an inner end 59 of the fixed handle 55 may be capable of being screwed into and out of the inner end 59. An end (not shown) of the adjustment screw 90 may extend into the recess in surface 58 of the fixed handle 55 and may be associated with the first end of 85 of the link 80 in such a way that screwing the adjustment screw 90 into and/or out of the inner end 59 of the fixed handle 55 defines a position of the first end 85 of the link 80 along the length of the fixed handle 55. An opposite, second end 86 of the link 80 may extend into the recess in the surface 68 of the movable handle 65 and may be pivotally secured to the movable handle 65. The link 80 may also include an engagement protrusion 82 that is capable of engaging an end of a release lever 100 that is pivotally disposed in an inner end 69 of the moveable handle 65 when the movable handle 65 is forced toward the fixed handle 55. By pressing the release lever 100, the end of the release lever 100 that has engaged the engagement protrusion 82 of the link 80 may release the engagement protrusion 82 of the link 80, enabling the movable handle 65 to move away from the fixed handle 55.

When the moveable handle 65 of the connector 30a/30b, 32a/32b is pivoted toward the fixed handle 55 of the connector 30a/30b, 32a/32b, the jaws 50 and 60 move toward one another, in converging or intersecting directions, and may be positioned close as to one another and/or closed onto each other.

In other embodiments, the jaws 50 and 60 of the connector 30a/30b, 32a/32b may be configured in such a way that, when they are positioned as close as possible to one another and closed by pivoting the moveable handle 65 toward the fixed handle 55, they extend in divergent directions. In either event, when the jaws 50 and 60 are brought together around a terminal, an electrical ground, etc., and held in a locked arrangement on the terminal, the electrical ground, etc., the jaws 50 and 60 may be positioned a sufficient distance apart from one another to receive and engage the terminal, the electrical ground, etc., and to establish a reliable electrical connection therewith.

Each connector 30a/30b, 32a/32b may include an insulative coating 35 on its fixed handle 55. The insulative coating 35 may provide an indication of the terminal (positive or negative) with which the connector is to be used. As an example, the insulative coating 35 on the fixed handle 55 of a connector 30a/30b that is designated for use on a positive terminal may be red, while the insulative coating 35 on the fixed handle 55 of a connector 32a/32b that is designated for use on a negative terminal or for connection to an electrical ground may be black, blue, or green.

As depicted by FIGS. 3 and 4, the fixed handle 55 of each connector 30a/30b, 32a/32b may be coupled to the end of an electrically conductive element 25 of one of the cables 20a/20b, 22a/22b in a manner that establishes electrical communication between the electrically conductive element 25, the fixed handle 55, and the jaw 50 associated with the fixed handle 55. That coupling may be permanent (e.g., by way of a clamped interference fit, by way of a weld, etc.). Alternatively, a removable coupling may be provided between the end of an electrically conductive element 25 of a cable 20a/20b, 22a/22b and a handle of a connector 30a/30b, 32a/32b according to this disclosure. Such a removable coupling may comprise an electrically conductive bracket 26 that is fixed to or that may be fixed to the fixed handle 55 of the connector 30a/30b, 32a/32b. The bracket 26 may include a receptacle 27 that is capable of receiving an end of the electrically conductive element 25 of the cable 20a/20b, 22a/22b, as well as an engagement element 28 (e.g., a bolt, etc.) capable of securing the end of the electrically conductive element 25 in the receptacle 27 of the bracket 26 and of establishing electrical communication between the electrically conductive element 25 and the bracket 26 (and the fixed handle 55 and corresponding jaw 50 of the connector 30a/30b, 32a/32b).

Figure 5:
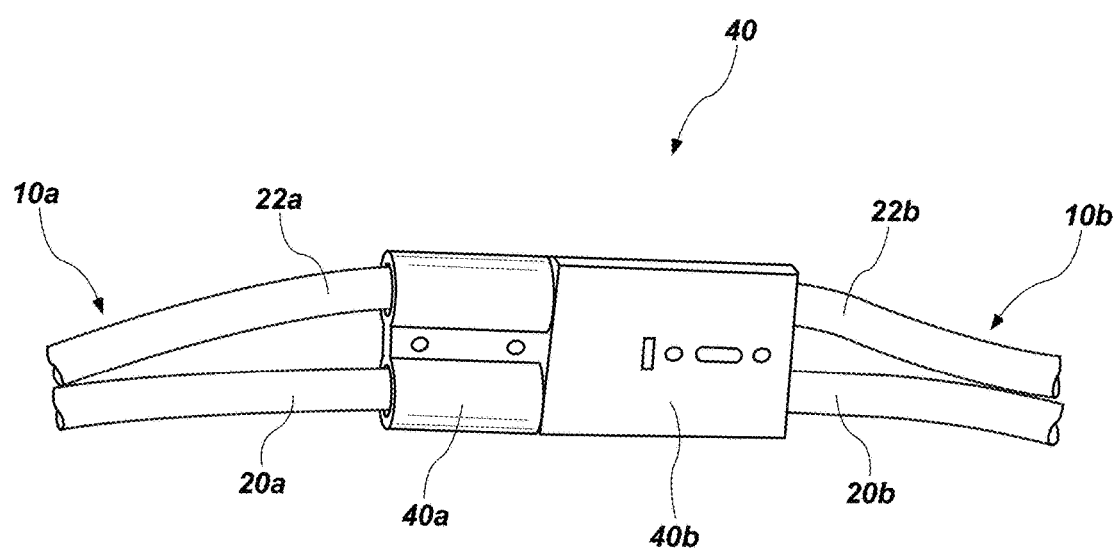
FIG. 5 depicts a plug that connects one end of the electrical cables to another end of the electrical cables.

FIG. 5 shows an embodiment of a plug 40 for connecting the two sides 10a and 10b of an electrical cable 10 (FIG. 1) to one another. The plug 40 may include a first side 40a at a central end 12a of a first side 10a of the electrical cable 10 and a second side 40b at a central end 12b of a second side 40b of the electrical cable 10. The first side 40a of the plug 40 may comprise a male member and the second side 40b of the plug 40 may comprise a female member. The first side 40a of such a plug 40 may include electrically conductive protrusions (not shown) that communicate with the electrically conductive elements of the cables 20a and 22a of the first side 10a of the electrical cable 10, while the second side 40b of such a plug 40 may include electrically conductive receptacles (not shown) that communicate with the electrically conductive elements of the cables 20b and 22b of the second side 10b of the electrical cable 10. The two sides 40a and 40b of the plug 40 may be capable of ensuring that cable 20a is electrically connected to cable 20b and that cable 22a is electrically connected to cable 22b, and of ensuring that cable 20a cannot be connected to cable 22b and that cable 22a cannot be connected to cable 20b.

Although the preceding disclosure provides many specifics, these should not be construed as limiting the scope of any of the ensuing claims. Other embodiments may be devised which do not depart from the scopes of the claims. Features from different embodiments may be employed in combination. The scope of each claim is, therefore, indicated and limited only by its plain language and the full scope of available legal equivalents to its elements.

What is claimed:

1. Cables for establishing an electrical connection or electrical grounding, comprising:
    a positive cable comprising an electrically conductive cable coated with an electrically insulative material, the positive cable including a first end and a second end;
    a negative cable comprising an electrically conductive cable coated with an electrically insulative material, the negative cable including a first end and a second end;
    a connector at each of the first end of the positive cable, the first end of the negative cable, the second end of the positive cable, and the second end of the negative cable, at least one connector comprising:
        locking pliers, including:
            a fixed handle in electrical communication with the electrically conductive cable of the positive cable or with the electrically conductive cable of the negative cable;
            a first jaw at an end of the fixed handle;
            a link including a first end slidingly received within a slot in the fixed handle and a second end opposite from the first end;
            a movable handle pivotally associated with the second end of the link;
            a second jaw pivotally associated with the first jaw and with the movable handle;
            a spring between the fixed handle and the second jaw;
            an adjustment screw associated with the first end of the link to define a position of the first end of the link relative to a length of the fixed handle, the adjustment screw and the link capable of defining a distance between opposed surfaces of the first jaw and the second jaw;
            a release pivotally associated with the movable handle and configured to engage the link to unlock positions of the first jaw and the second jaw and to release a battery terminal, a battery connector, or an electrical ground secured between the first jaw and the second jaw; and an electrically insulative coating on the fixed handle and on the movable handle, the first jaw and the second jaw, when positioned as close as possible to one another and closed by pivoting the moveable handle toward the fixed handle, being oriented in divergent directions.

2. The cables of claim 1, comprising a first positive connector at the first end of the positive cable and a first negative connector at the first end of the negative cable.

3. The cables of claim 2, comprising a second positive connector at the second end of the positive cable and a second negative connector at the second end of the negative cable.

4. The cables of claim 2, wherein:
the electrically insulative coating on the fixed handle and on the moveable handle of the first positive connector is red; and
the electrically insulative coating on the fixed handle and on the movable handle of the first negative connector is black.

5. The cables of claim 1, wherein:
the electrically insulative material on the positive cable is red; and
the electrically insulative material on the negative cable is black.

6. The cables of claim 1, wherein the at least one connector is fixedly secured to the first end of the positive cable, the first end of the negative cable, the second end of the positive cable, or the second end of the negative cable.

7. The cables of claim 1, wherein the at least one connector is removably secured to the first end of the positive cable, the first end of the negative cable, the second end of the positive cable, or the second end of the negative cable.

8. The cables of claim 7, wherein the at least one connector further comprises a cable mounting bracket secured to and in electrical communication with at least one of the fixed handle and the movable handle, the cable mounting bracket including:
a receptacle capable of receiving an end of an electrically conductive cable; and
an engagement element capable of securing the end of the electrically conductive cable in the receptacle and establishing electrical communication between the electrically conductive cable and the cable mounting bracket.

9. The cables of claim 1, wherein the first jaw and the second jaw of the locking pliers are configured to clamp onto and electrically engage a battery terminal.

10. The cables of claim 1, wherein the first jaw and the second jaw, when positioned as close as possible to one another and closed by pivoting the moveable handle toward the fixed handle, are oriented in substantially the same direction or in converging or intersecting directions.

11. The cables of claim 1, wherein the first jaw and the second jaw of the locking pliers are configured to clamp onto and electrically engage a battery terminal.

12. A connector for cables for establishing an electrical connection or for electrical grounding, comprising:
locking pliers, including:
a fixed handle in electrical communication with an electrically conductive cable of a positive cable or with an electrically conductive cable of a negative cable;
a first jaw at an end of the fixed handle;
a link including a first end slidingly received within a slot in the fixed handle and a second end opposite from the first end;
a movable handle pivotally associated with the second end of the link;
a second jaw pivotally associated with the first jaw and with the movable handle;
a spring between the fixed handle and the second jaw;
an adjustment screw associated with the first end of the link to define a position of the first end of the link relative to a length of the fixed handle, the adjustment screw and the link capable of defining a distance between opposed surfaces of the first jaw and the second jaw;
a release pivotally associated with the movable handle and configured to engage the link to unlock positions of the first jaw and the second jaw and to release a battery terminal, a battery connector, or an electrical ground secured between the first jaw and the second jaw; and
an electrically insulative coating on the fixed handle and on the movable handle,
the first jaw and the second jaw, when positioned as close as possible to one another and closed by pivoting the moveable handle toward the fixed handle, being oriented in divergent directions; and
a cable mount capable of receiving and electrically connecting an end of an electrically conductive cable to at least one of the fixed handle and the movable handle.

13. The connector of claim 12, wherein the cable mount is capable of removably receiving the end of the electrically conductive cable.

14. The connector of claim 13, wherein the cable mount comprises:
a receptacle capable of receiving the end of the electrically conductive cable; and
an engagement element capable of securing the end of the electrically conductive cable in the receptacle and establishing electrical communication between the electrically conductive cable and the cable mount.

15. The connector of claim 12, wherein the first jaw and the second jaw, when positioned as close as possible to one another and closed by pivoting the moveable handle toward the fixed handle, are oriented in substantially the same direction or in converging or intersecting directions.

* * * * *